United States Patent
Kasriel et al.

(10) Patent No.: US 6,721,780 B1
(45) Date of Patent: Apr. 13, 2004

(54) PREDICTIVE PRE-DOWNLOAD OF NETWORK OBJECTS

(75) Inventors: Stéphane Kasriel, Neuilly (FR); Xavier Casanova, Saint Germain en Laye (FR)

(73) Assignee: Fireclick, Inc., Mountain View, CA (US)

( * ) Notice: Subject to any disclaimer, the term of this patent is extended or adjusted under 35 U.S.C. 154(b) by 0 days.

(21) Appl. No.: 09/436,136

(22) Filed: Nov. 9, 1999

(51) Int. Cl.[7] ............................................. G06F 15/16
(52) U.S. Cl. .................... 709/203; 709/217; 709/219; 709/234; 709/235
(58) Field of Search ................................ 709/203, 217, 709/219, 234, 235

(56) References Cited

U.S. PATENT DOCUMENTS

| | | | | |
|---|---|---|---|---|
| 5,727,129 A | * | 3/1998 | Barrett et al. ................. | 706/10 |
| 5,774,660 A | | 6/1998 | Brendel et al. | |
| 5,826,258 A | * | 10/1998 | Gupta et al. .................... | 707/4 |
| 5,859,971 A | | 1/1999 | Bittinger et al. | |
| 5,878,429 A | | 3/1999 | Morris et al. | |
| 5,978,841 A | * | 11/1999 | Berger ........................ | 709/217 |
| 6,003,087 A | | 12/1999 | Housel, III et al. | |
| 6,098,152 A | * | 8/2000 | Mounes-Toussi ........... | 711/134 |
| 6,377,978 B1 | * | 4/2002 | Nguyen ....................... | 709/206 |

FOREIGN PATENT DOCUMENTS

| | | |
|---|---|---|
| WO | WO 00/28433 A3 | 5/2000 |
| WO | WO 00/28433 A2 | 5/2000 |

OTHER PUBLICATIONS

Jeffrey Mogul et al. "HTTP Delta Clusters and Templates". Network Working Group, Internet Draft, Aug. 24, 2000.
Alberto Accomazzi. "rproxy", rproxy/libhsync pages. Jan. 8, 2002.

* cited by examiner

Primary Examiner—Frantz B. Jean
(74) Attorney, Agent, or Firm—Robert M. McDermott

(57) ABSTRACT

The invention provides a method and system for fetching network objects from a server, such as used in conjunction with an internetworking environment. A web server maintains information regarding which web pages are most likely to be requested by users, and pre-downloads those web pages to associated web clients in advance of actual requests being made by the user. This allows the user to receive the web page prior to actual request, and thus reduces time the user waits for delivery of the web page. The web server maintains statistical information responsive to requests for information made by users, to estimate which links between web pages are most likely to be followed. The web server provides this information to web clients as hints for pages for web clients to pre-download. The web server also maintains rules regarding web pages most desirable to present to users, to provide the greatest value for the web site. These rules can be responsive to statistical measures, to information about categories of users, to demographic information, to past behavior of specific users at the web site, or to other relevant factors. Examples described herein relate to web pages, but the invention is broadly applicable to many different types of requests for information (such as for example database queries and other libraries of information).

30 Claims, 2 Drawing Sheets

PREDICTIVE PRE-DOWNLOAD OF NETWORK OBJECTS

BACKGROUND OF THE INVENTION

1. Field of the Invention

This invention relates to pre-download of network objects from a server, such as used in conjunction with an internetworking environment.

2. Related Art

In computer networks, client devices often request and receive information from server devices. A common example of such client-server interaction occurs during use of the World Wide Web, in which a web client (sometimes called a web "browser") requests web pages and embedded network objects from a web server (sometimes called a "web site").

One problem in the known art is that web clients experience some delay between the time they request a web page from a web server, and the time that web page is presented by the web client software to the user. This delay can be due to the size of the web page, the network distance to the web server, the load on the web server, or other factors. It would be advantageous to reduce the latency time during which users are waiting for web pages to be delivered and presented from web servers.

One known method is to provide a cache at the web client device. This cache can take the form of a section of memory or mass storage reserved for web pages that the user has already requested or that the web client thinks the user is likely to request in the near future. This cache can also take the form of a separate device that maintains memory or mass storage for web pages for a plurality of users. If the web page requested by the user are already stored in the cache, they can be presented to the user without delay due to requesting and receiving that data from the web server.

While this known method can achieve the general result of reducing the latency time for delivery and presentation of web pages, it has the drawback that it is not as effective as possible at determining which web pages are most likely to be requested. It is thus not as effective as possible at anticipating which web pages the user is likely to request and have those web pages already received from the web server.

Accordingly, it would be advantageous to provide a technique for pre-download of network objects from a server, such as used in conjunction with an internet-working environment, which reduces time users wait for delivery and presentation of those web pages. This advantage is achieved in an embodiment of the invention in which a web server maintains statistical information regarding which web pages are most likely to be requested by users, and pre-downloads those web pages to associated web clients in advance of actual requests being made by the user.

SUMMARY OF THE INVENTION

The invention provides a method and system for pre-downloading network objects from a server, such as used in conjunction with an internetworking environment. A web server maintains information regarding which web pages are most likely to be requested by users, and pre-downloads those web pages to associated web clients in advance of actual requests being made by the user. This allows the user to receive the web page prior to actual request, and thus reduces time the user waits for delivery of the web page.

The web server maintains statistical information responsive to requests for information made by users, to estimate which links between web pages are most likely to be followed. The web server provides this information to web clients as hints for pages for the web server to pre-download. The web server also maintains rules regarding web pages most desirable to present to users, to provide the greatest value for the web site. These rules can be responsive to statistical measures, to information about categories of users, to demographic information, to past behavior of specific users at the web site, or to other relevant factors.

The invention provides an enabling technology for reducing latency delay in providing information, so as to obtain substantial advantages and capabilities that are novel and non-obvious in view of the known art. Examples described below relate to web pages, but the invention is broadly applicable to many different types of requests for information (such as for example database queries and other libraries of information).

DETAILED DESCRIPTION OF THE PREFERRED EMBODIMENT

Figure 1:
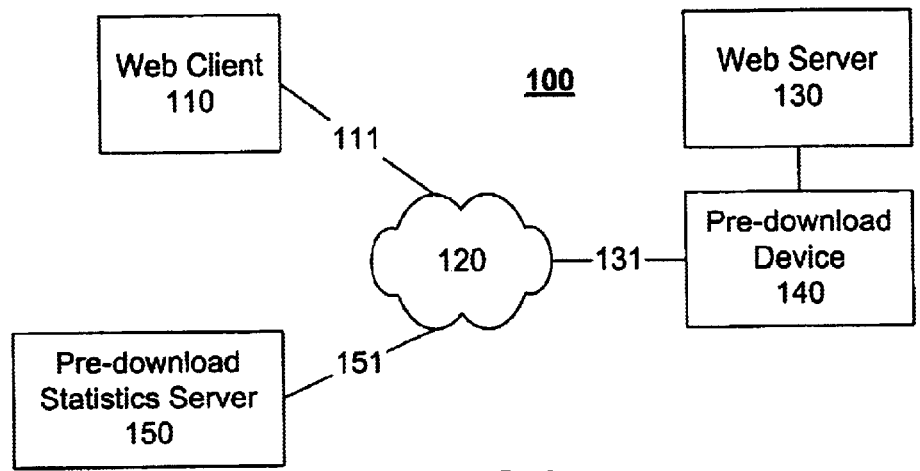
FIG. 1 shows a block diagram of a system for pre-downloading network objects from a server.

In the following description, a preferred embodiment of the invention is described with regard to preferred process steps and data structures. Embodiments of the invention can be implemented using general purpose processors or special purpose processors operating under program control, or other circuits, adapted to particular process steps and data structures described herein. Implementation of the process steps and data structures described herein would not require undue experimentation or further invention.

Lexicography

The following terms refer or relate to aspects of the invention as described below. The descriptions of general meanings of these terms are not intended to be limiting, only illustrative.

network objects—in general, web pages and data elements embedded therein web server—in general, a server for providing web pages and data elements embedded therein to requesting web clients pre-download—in general, requesting web pages and data elements, by a web client from a web server, before a user at that web client specifically requests them actual request—in general, an action taken by a user to specifically request a web page, such as selecting a link to that web page delivery—in general, sending a web page from a web server to a web client statistical information—in general, information regarding which links on a web page are relatively more or less likely to be selected by a user viewing that web page pre-download hints—in general, information provided by a web server to web clients suggesting web pages to pre-download before actual request pre-download rules—in general, information at a web server regarding which web pages are relatively more or less desirable for the user to receive without delivery latency demographic information—in general, information about the user at a web client (such as their locale, time zone, or primary language)

past behavior—in general, information about a user responsive to whether that user is a frequent user of the web site, frequent purchaser of goods or services at that web site, or other relevant past behavior client and server—These terms refer to a relationship between two devices, particularly to their relationship as client and server, not necessarily to any particular physical devices.

For example, but without limitation, a particular client device in a first relationship with a first server device, can serve as a server device in a second relationship with a second client device.

client device and server device—These terms refer to devices taking on the role of a client device or a server device in a client-server relationship (such as an HTTP web client and web server). There is no particular requirement that any client devices or server devices must be individual physical devices. They can each be a single device, a set of cooperating devices, a portion of a device, or some combination thereof.

As noted above, these descriptions of general meanings of these terms are not intended to be limiting, only illustrative. Other and further applications of the invention, including extensions of these terms and concepts, would be clear to those of ordinary skill in the art after perusing this application. These other and further applications are part of the scope and spirit of the invention, and would be clear to those of ordinary skill in the art, without further invention or undue experimentation.

System Elements

FIG. 1 shows a block diagram of a system for pre-downloading network objects from a server.

A system 100 includes a set of web clients 110, a communication network 120, a web server 130, a pre-download device 140, and a pre-download statistics server 150.

Each web client 110 includes a processor, program and data memory, mass storage, and a client communication link 111. The processor, program and data memory, and mass storage operate in conjunction to perform the functions of a web client 110 (also known as a web "browser"). The Web client 110, using the HTTP ("hypertext transfer protocol") requests, requests network objects from the Web server 130, and using HTTP responses, receives those network objects from the Web server 130. Although, in a preferred embodiment, the Web client 110 uses the HTTP protocol or a variant thereof, there is no particular requirement for use of that specific protocol or its variants. The requests and responses are routed using the communication network 120, and are received and processed by the Web server 130.

The client communication link 111 operates to couple the Web client 110 to the communication network 120.

In a preferred embodiment, the communication network 120 includes an Internet, intranet, extranet, virtual private network, enterprise network, or another form of communication network. In a preferred embodiment, the communication network 120 includes a network capable of routing messages between and among one or more Web clients 110 and web servers 130. However, there is no particular requirement that the communication network 120 must comprise an actual network, so long as the communication network 120 includes at least some technique for communication between the Web client 110 and web servers 130.

The Web server 130 includes a processor, program and data memory, mass storage, and a server communication link 131. The processor, program and data memory, and mass storage operate in conjunction to perform the functions of a web server 110 (also known as a web "site"). The Web server 130 responds to the Web client 110 using the HTTP protocol. Although, in a preferred embodiment, the Web server 130 uses the HTTP protocol or a variant thereof, there is no particular requirement for use of that specific protocol or its variants.

The pre-download device 140 intercepts requests for network objects from the Web client 110, and responses from the Web server 130. The pre-download device 140 determines which network objects are most likely to be requested by the Web client 110 from the Web server 130. In response to this determination the pre-download device 140 directs the Web client 110 to request those network objects from the Web server 130, prior to their actual request from a user at the Web client 110. Thus, the Web client 110 will have those network objects available in its local cache prior to their actual request; when actually requested by a user at the Web client 110, the Web client 110 will be able to present those network objects to the user with relatively little latency.

Figure 2:
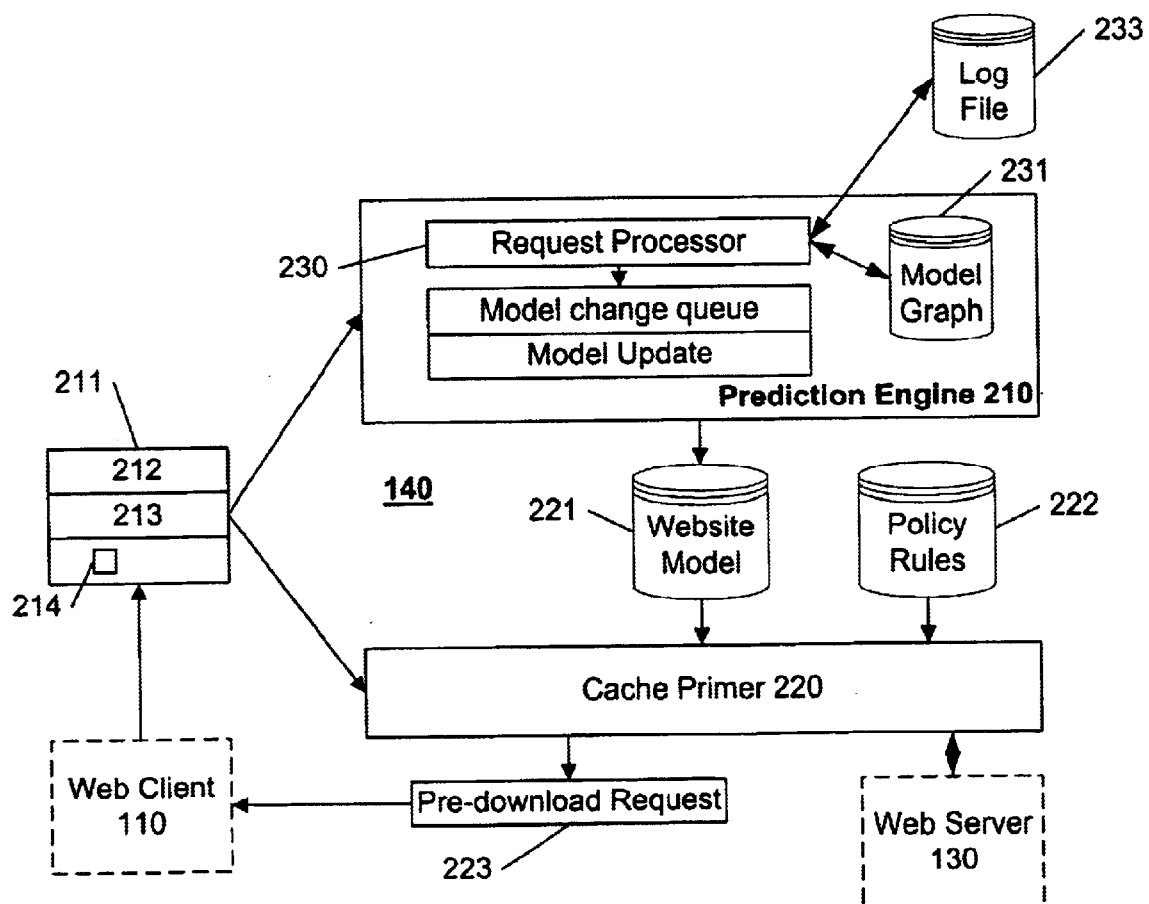
FIG. 2 shows a block diagram of a pre-download device, as used in a system for pre-downloading network objects from a server.

The pre-download device 140 is further described with respect to FIG. 2.

The pre-download statistics server 150 includes a processor, program and data memory, mass storage, and a statistics server communication link 151. The pre-download statistics server 150 operates in similar manner to a web server 130, with a difference that the pre-download statistics server 150 receives and maintains pre-download statistics for the Web server 130. Interested parties can later examine those pre-download statistics; these could include a user at the Web client 110, an operator at the Web server 130, or a user (or program) at another device coupled to the communication network 120.

Pre-Download Device

FIG. 2 shows a block diagram of a pre-download device, as used in a system for pre-downloading network objects from a server.

The pre-download device 140 includes a prediction engine 210, and a cache primer 220.

Prediction Engine

The prediction engine 210 intercepts and processes a sequence of messages 211 including requests from the Web client 110 that are directed to the Web server 130.

Each message 211 includes a first URL 212 indicating a referring network object, and a second URL 213 indicating a target network object. Each message 211 also includes additional information, including a time stamp, a source IP address and port, a destination IP address and port, and a file size for the target network object. Each message 211 also includes a requester-bit 214, indicating whether the request for the target network object comes from an actual request by user at the Web client 110, or from the Web client 110 in response to direction by the pre-download device 140.

The prediction engine 210 includes a request-processing element 230, a web-site model graph 231, a model-change queue 232, and a model-updating element 240.

In a preferred embodiment, the request-processing element 230 includes a separate processing thread, so as to operate in conjunction or in parallel with other operations performed by the prediction engine 210. Separate processing threads are known in the art of computer systems architecture.

The request-processing element 230 maintains the Web-site model graph 231, including a directed graph of nodes (each indicating a network object), and transitions between nodes (each indicating a possible transition selected by a user at the Web client 110).

The request-processing element 230 receives each message 211, and parses the message 211 for the first URL 212, the second URL 213, and the requester-bit 214. In response thereto, the request-processing element 230 determines (in the Web-site model graph 231) an initial node, a final node, a transition from the initial note to the final node, and a measure of a weighted probability of transition from to the final note from the initial node.

The request-processing element 230 can determine from each message 211 whether that message 211 was responsive to an actual request by a user at the Web client 110. If so, the request-processing element 230 writes information from that message 211 to a raw log file 233.

The raw log file 233 comprises information regarding traffic at the Web 111 server 130, so the Web server 130 can run an independent process or thread for determining conclusions from that traffic information.

Since the Web site 130 is a collection of network objects that may possibly change over time, there are likely to be periodic changes to the Web-site model graph 231. These changes can include new nodes, new transitions, and new weighted probabilities assigned to transitions in response to selections made by the user at the Web client 110.

Accordingly, the request-processing element 230, in response to changes to the Web-site model graph 231, maintains the model-change queue 232, indicating relatively recent changes to the web-site model graph 231.

In a preferred embodiment, the model-updating element 240 includes a separate processing thread, so as to operate in conjunction or in parallel with other operations performed by the prediction engine 210.

The model-updating element 240, responsive to the model-change queue 232, determines whether and when there have been sufficient changes to the web-site model graph 231 to rewrite a Web-site model database 221. For example, the model-updating element 240 can determine there have been sufficient changes to the web-site model graph 231 when the model-change queue 232 is longer than a pre-selected threshold. When there have been sufficient changes to rewrite the web-site model database 221, the model-updating element 240 performs the update.

Cache Primer

The cache primer 220 responds to each message 211, to the web-site model database 221, and to a policy rules database 222, to generate a sequence of pre-download request messages 223. Each pre-download request message 223 instructs the Web client 110 to request one or more target network objects without any actual request for those target network objects from a user at the web client 110.

In a preferred embodiment, the cache primer 220 acts as a reverse-proxy device, thus caching network objects from the Web server 130 for sending to Web clients 110. In so doing, the cache primer 220 preferably follows a set of administrative rules, including one or more of, or some combination of, the following:

The cache primer 220 is responsive to facts about the Web server 130, such as a computation load on the Web server 130, or a time of day or data of the week at the Web server 130.

The cache primer 220 is responsive to facts about the Web client 10, such as a source IP address and port, a user ID for a user at the Web client 110, or a cookie stored at the Web client 110. In a preferred embodiment, a cookie stored at the Web client 110 can include a purchase history for the user, demographic information for the user, or other information about the user that might be a value (such as their ISP, country of origin, or time zone).

The cache primer 220 is responsive to facts about the usage of the Web server 130 by the user at the Web client 110, such as an amount of time spent by the user at the Web server 130, a number of links followed by the user local to the Web server 130, or a relative distance of the requested network object from a "purchase page" or other important network object at the Web server 130.

The cache primer 220 examines each intercepted message 211, and determines whether one or more policy rules in the policy rules database 222 applies to that intercepted message 211. The policy rules database 222 includes a set of pairs, each of which it tends to match against a requested URL, and an identifier for the Web client 110, and each of which indicates a hint for a network object to be pre-downloaded, in response to a matched policy rule. For example, a policy rule can attempt to match against a particular user and a particular Web client 110, so as to take that particular user directly to a "purchase page" or other important network object at the Web server 130.

In a preferred embodiment, the policy rules database 222 is constructed in the form of an expert pattern language, using a graphical user interface and developed by an operator (not shown) at the cache primer 220.

If no policy rules from the policy rules database 222 are successfully matched against the intercepted message 211, the cache primer 220 defaults at a lowest priority to statistical information in the web-side model database 221.

As noted above, the web-site model database 221 is constructed in response to incoming messages 211. In a preferred embodiment, the policy rules database 222 also includes a set of statistical matching rules, each of which it tends to match against an incoming URL having imaginable pattern.

Each statistical matching rule includes a matchable regular expression, and a rule for generating a node or transition in the web-site model graph 231, and the same note or transition in the web-site model database 221. Regular expressions are known in the art of compilers and pattern matching.

In a preferred embodiment, the cache primer 220 uses a finite state machine to detect the presence of an incoming URL possibly matching each regular expression. The use of the finite state machine is further described with reference to FIG. 3.

Finite State Machine

Figure 3:
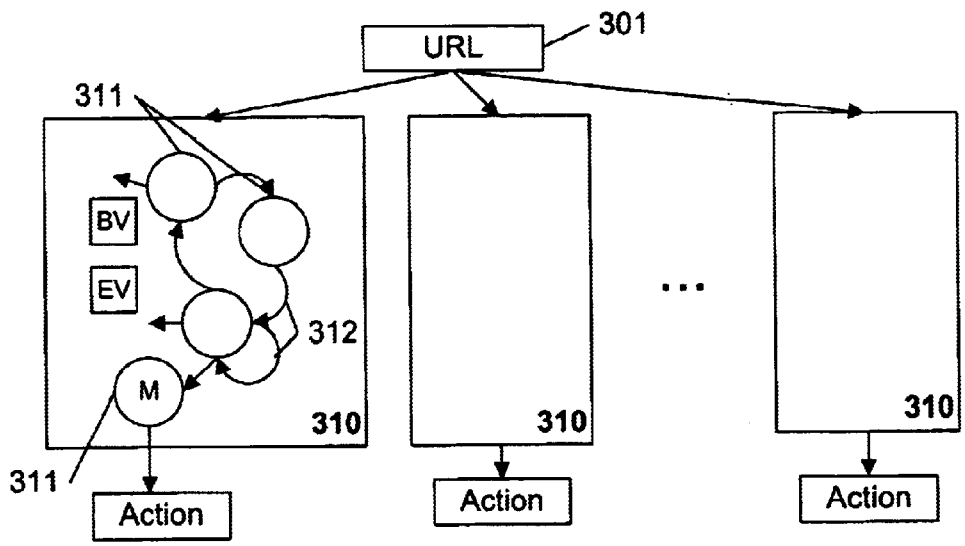
FIG. 3 shows the use of a finite state machine to detect the presence of an incoming URL possibly managing each regular expression.

FIG. 3 shows the use of a finite state machine to detect the presence of an incoming URL possibly managing each regular expression.

An incoming URL 301 is input, one character at a time, in parallel, to a set of finite state machines 310. Each finite state machine 310 includes a plurality of nodes 311 and a plurality of transitions 312. Each transition 312 is triggered explicitly by a single defined character, or by a single character of any type. Each node 311 can also be labeled with a "begin variable" or an "end variable" marker, so as to begin or end a character-string variable. One selected node 311 is labeled as a "match/ no match" node 311, and associated with an action to be taken in response to matching the selected finite state machine 310.

For example, a regular expression can be such as that indicated in equation 320:

$$\text{\textasciicircum{}1id=\textasciicircum{}2\&\textasciicircum{}3} \qquad (320)$$

In equation 320, the boldface value is preceded by a ^, such as ^1, indicate a character-string variable to be parsed and identified by at least one finite state machine 310. The non-boldface characters, such as "id=", are recognized by at least one finite state machine 310, so as to parse and identify at least one associated character-string variable.

As noted above, each incoming URL 301 is input in parallel to a plurality of finite state machines 310. Thus, matching (or possible determination of non-match) of the each incoming URL 301 can be performed in order of (constant time).

Method of Operation

Figure 4:
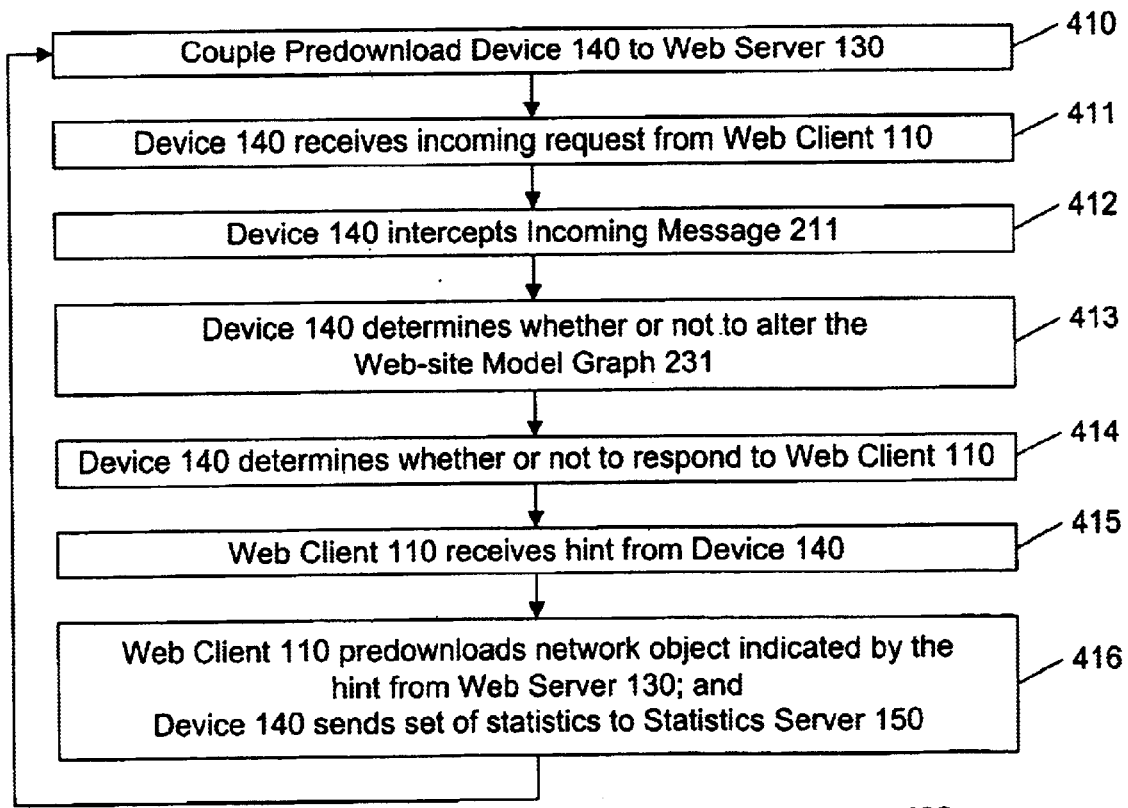
FIG. 4 shows a process flow diagram of a method for operating a system for pre-downloading network objects from a server.

FIG. 4 shows a process flow diagram of a method for operating a system for pre-downloading network objects from a server.

A method 400 is performed by the system 100. Although the method 400 is described serially, the steps of the method 400 can be performed by separate elements in conjunction or in parallel, whether a synchronously, in a pipelined manner, or otherwise. There is no particular requirement that the method 400 be performed in the same order in which this description lists the steps, except where so indicated.

At a flow point 410, the pre-download device 140 is coupled to the Web server 130, and is ready to receiving incoming requests from one or more Web clients 110.

At a step 411, the pre-download device 140 receives an incoming request from a Web client 110.

At a step 412, the pre-download device 140 intercepts an incoming message 211 associated with the incoming request. As part of this step, the pre-download device 140 parses the incoming message 211 for a reference URL and for a target URL. As part of this step, the pre-download device 140 determines both the reference URL and the target URL, and any other relevant information about the user or the Web client 110, such as the source IP address and port.

At a step 413, the pre-download device 140 determines whether or not to alter the web-site model graph 231 (such as by adding nodes, adding transitions, for altering weighted probabilities associated with internode transitions). As part of this step, the pre-download device 140 determines whether or not to rewrite the Web-site model database 221.

At a step 414, the pre-download device 140 determines whether or not to respond to the Web client 110 with a hint, indicating a network object to pre-download from the Web server 130. If so, as part of this step, the pre-download device inserts the hint into the network object, before sending the network object from the Web server 130 to the Web client 110.

At a step 415, the Web client 110 receives the hint from the pre-download device 140 (along with the network object it requested from the Web server 130).

At a step 416, the Web client 110 pre-downloads the network object indicated by the hint from the Web server 130. As part of this step, the request for the network object to be pre downloaded includes a requester-bit indicating that the network object is being requested in response to a hint from the pre-download device 140.

At a step 416, the pre-download device 140 determines a set of statistics associated with actual requests from one or more users at Web clients 110, and outputs that set of statistics to the pre-download statistics server 150. As part of this step, the pre-download statistics server 150 maintains those statistics associated with actual requests for use by other parties.

The method continues with the flow point 410.

Generality of the Invention

The invention has general applicability to various fields of use, not necessarily related to the services described above. For example, these fields of use can include one or more of, or some combination of, the following:

Queries to database servers, in which queries are correlated with regard to database records when relatively close in time.

Requests for information from information libraries, in which queries are correlated with regard to library documents when relatively close in time.

Other types of requests for information from server devices.

Other and further applications of the invention in its most general form, would be clear to those skilled in the art after perusal of this application, and are within the scope and spirit of the invention.

Alternative Embodiments

Although preferred embodiments are disclosed herein, many variations are possible which remain within the concept, scope, and spirit of the invention, and these variations would become clear to those skilled in the art after perusal of this application.

What is claimed is:

1. A method including steps of:

intercepting at a device one or more requests from a web client to a web server for first network objects;

intercepting at said device one or more responses to said requests from said web server;

determining at said device a set of second network objects most probable to be requested in the future from said web server; and sending a first message from said device to said web client responsive to said step of determining, said first message informing said web client of at least some of said second network objects to be cached by said web client.

2. A method in claim 1, further including the step of sending a second message from said web client to said web server in response to a result of said step of sending said first message.

3. A method including steps of:

intercepting at a device one or more requests from a web client to a web server for first network objects;

intercepting at said device one or more responses to said requests from said web server;

determining at said device a set of second network objects most desirable to be requested in a future from said web server; and sending a first message from said device to said web client responsive to said step of determining, said first message informing said web client of at least some of said second network objects to be cached by said web client.

4. A method as in claim 3, further including the step of sending a second message from said web client to said web server in response to a result of said step of sending said first message.

5. A method as in either claim 1 or claim 3, further including the step of labeling requests from said web client as to whether said requests are responsive to actual user requests or to send hints.

6. A method as in either claim 1 or claim 3, whereby a latency for requesting an identical network object is reduced when requested in response to an actual user request.

7. A method as in either claim 1 or claim 3, wherein said step of determining includes communicating with a statistics server, said statistics server maintaining statistics regarding a set of request pairs for network objects, said request pairs indicating transitions between a first network object and a next network object; and wherein said statistics server is a separate device from said device, said web client and said web server.

8. A method as in either claim 1 or claim 3, wherein said step of determining includes maintaining a set of rules in response to said requests, said rules indicating transitions between first network objects and next network objects; and making said determination in response to a result of said steps of maintaining.

9. A method as in claim 8, wherein said rules include values for variables gleaned from said requests for network objects.

10. A method as in claim 8, wherein said rules are responsive to at least one of: statistical measures, information about categories of users, demographic information, past behavior of specific users at a web site.

11. A network device, comprising:
an interface to a network;
a processor;
a memory storing information including instructions, the instructions executable by said processor, the instructions including the steps of (a) intercepting at said network device one or more requests on said network from a web client to a web server for first network objects; (b) intercepting at said device one or more responses to said requests from said web server; (c) determining at said network device a set of second network objects most probable to be requested in the future from said web server; and (d) sending a first message from said network device to said web client responsive to said step of determining, said first message informing said web client of at least some of said second network objects to be cached by said web client.

12. A network device as in claim 11, wherein the instructions further include the step of sending a second message from said web client to said web server in response to a result of said step of sending said first message.

13. A network device, comprising:
an interface to a network;
processor;
a memory storing information including instructions, the instructions executable by said processor, the instructions including the steps of (a) intercepting at said network device a set of requests on said network from a web client to a web server for first network objects;

(b) intercepting at said device one or more responses to said requests from said web server; (c) determining at said network device one a set of second network objects most desirable to be requested in the future from said web server; and (d) sending a first message from said network device to said web client responsive to said step of determining, said first message informing said web client of at least some of said second network objects to be cached by said web client.

14. A network device as in claim 13, wherein the instructions further include the step of sending a second message from said web client to said web server in response to a result of said step of sending said first message.

15. A network device as in either claim 11 or claim 13, wherein the instructions further include the step of labeling requests from said web client as to whether said requests are responsive to actual user requests or to send hints.

16. A network device as in either claim 11 or claim 13, whereby a latency for requesting an identical network object is reduced when requested in response to an actual user request.

17. A network device as in either claim 11 or claim 13, wherein said step of determining includes communicating with a statistics server, said statistics server maintaining statistics regarding a set of request pairs for network objects, said request pairs indicating transitions between a first network object and a next network object; and wherein said statistics server is a separate device from said device, said web client, and said web server.

18. A network device as in either claim 11 or claim 13, wherein said step of determining includes maintaining a set of rules in response to said requests, said rules indicating transitions between first network objects and next network objects; and making said determination in response to a result of said steps of maintaining.

19. A network device as in claim 18, wherein said rules include values for variables gleaned from said requests for network objects.

20. A network device as in claim 18, wherein said rules are responsive to at least one of: statistical measures, information about categories of users, demographic information, past behavior of specific users at a web site.

21. A memory storing information including instructions executable by a processor, the instructions including the steps of:

intercepting at a device one or more requests from a web client to a web server for first network objects;

intercepting at said device one or more responses to said requests from said web server;

determining at said device a set of second network objects most probable to be requested in the future from said web server; and sending a first message from said device to said web client responsive to said step of determining, said first message informing said web client of at least some of said second network objects to be cached by said web client.

22. A memory as in claim 21, wherein the instructions further include the step of sending a second message from said web client to said web server in response to a result of said step of sending said first message.

23. A memory storing information including instructions executable by a processor, the instructions including the steps of:

intercepting at a device one or more requests from a web client to a web server for first network objects;

intercepting at said device one or more responses to said requests from said web server;

determining at said device a set of second network objects most desirable to be requested in a future from said web server; and sending a first message from said device to said web client responsive to said step of determining, said first message informing said web client of at least some of said second network objects to be cached by said web client.

24. A memory as in claim 23, wherein the instructions further include the step of sending a second message from said web client to said web server in response to a result of said step of sending said first message.

25. A memory as in either claim 21 or claim 23, wherein the instructions further include the step of labeling requests from said web client as to whether said requests are responsive to actual user requests or to send hints.

26. A memory as in either claim 21 or claim 23, whereby a latency for requesting an identical network object is reduced when requested in response to an actual user request.

27. A memory as in either claim 21 or claim 23, wherein said step of determining includes communicating with a statistics server, said statistics server maintaining statistics regarding a set of request pairs for network objects, said request pairs indicating transitions between a first network object and a next network object; and wherein said statistics server is a separate device from said device, said web client and said web server.

28. A memory as in either claim 21 or claim 23, wherein said step of determining includes maintaining a set of rules in response to said requests, said rules indicating transitions between first network objects and next network objects; and making said determination in response to a result of said steps of maintaining.

29. A memory as in claim 28, wherein said rules include values for variables gleaned from said requests for network objects.

30. A memory as in claim 28, wherein said rules are responsive to at least one of: statistical measures, information about categories of users, demographic information, past behavior of specific users at a web site.

* * * * *